April 3, 1934.        H. L. KING        1,953,614
INDICATING DEVICE
Filed Jan. 12, 1933
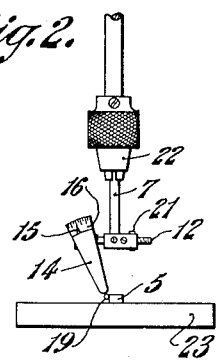
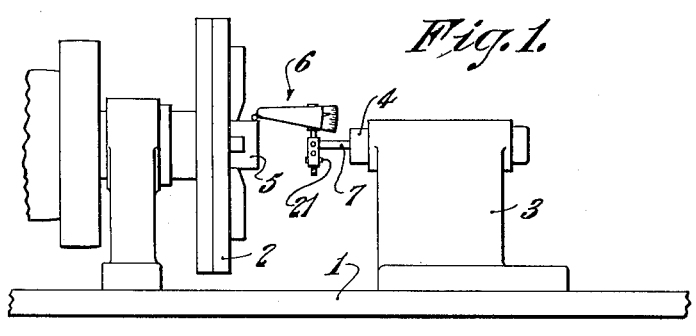
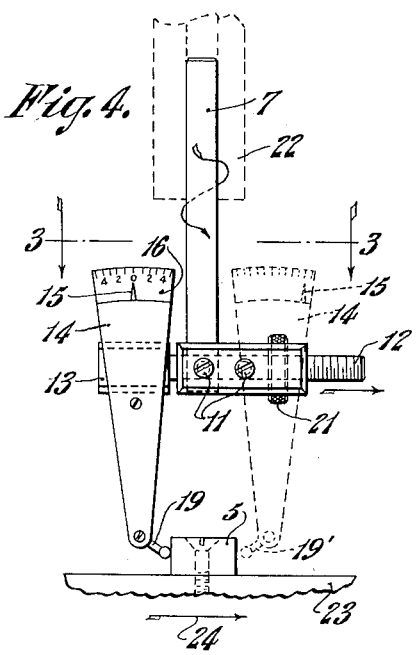
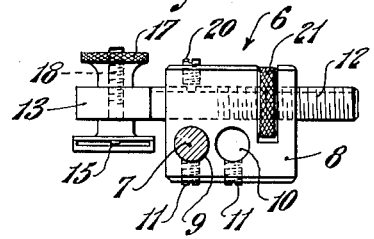
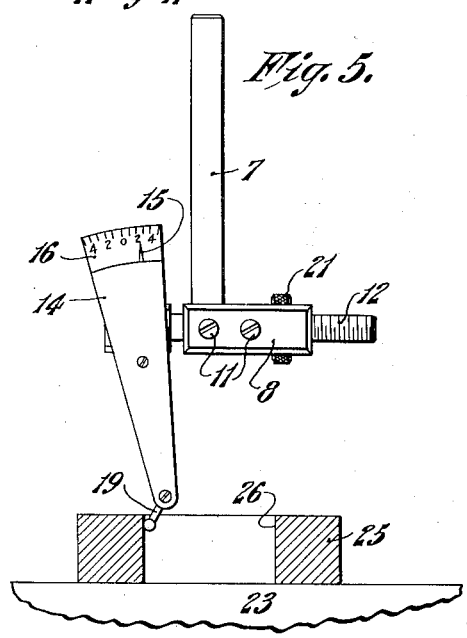
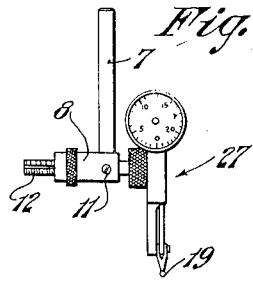
INVENTOR,
Harry L. King,
BY
Harry W. Bowen
ATTORNEY.

Patented Apr. 3, 1934

1,953,614

UNITED STATES PATENT OFFICE 1,953,614

INDICATING DEVICE

Harry L. King, Springfield, Mass.

Application January 12, 1933, Serial No. 651,274

1 Claim. (Cl. 33—172)

This invention relates to improvements in indicating devices.

An object of the invention is to accurately locate, or position a cutting tool, when the same is to be used in a milling machine, drill press, or lathe, for example.

The invention comprises, in connection with an indicating instrument, a pointer which swings over a scale that is usually graduated in thousandths of an inch, a block member which supports the instrument, means in the block member comprising a threaded rod to which the indicating device is adjustably connected, a milled nut on the threaded rod for moving the indicator in opposite directions, a supporting rod secured to the block member, for insertion in the tool-receiving chuck, or other parts of the machine, a button, or block, element, designed to be secured to the bed plate portion of a milling machine, or to the face plate of a lathe. The indicating device includes a feeler member which actuates the pointer. This instrument is then installed in the tool-receiving chuck of a machine and the feeler member is brought into contact with the button, by moving the bed plate portion of the machine, for actuating the pointer. The feeler is now rotating around the surface of the button and the position of its pointer will indicate, whether or not, the tool chuck is accurately positioned. In other words, whether or not, the axis of the rod, which supports the indicator, lies in the axis of the button. If it is, then, when the indicating tool is removed from the tool chuck and the cutting tool, as a milling cutter, or drill, is substituted, the piece of work will be accurately machined, as will be fully described.

Referring to the drawing:—

Fig. 1 is an elevational view, showing the device installed in a lathe tail stock, with the feeler member engaging a button on the face plate.

Fig. 2 is a view, illustrating the device in engagement with the button on a platform, or base plate, of a drill press.

Fig. 3 is a top plan view on the line 3—3 of Fig. 4, illustrating the adjustable feature of the instrument.

Fig. 4 illustrates the device installed in a tool chuck and with the feeler in engagement with the outer surface of the button in full lines and away from the button, in dotted lines.

Fig. 5 hows the indicator in engagement with the inner surface of a ring, and

Fig. 6 is a modification, showing a larger dial.

Referring to the drawing in detail:—

1 indicates the bed plate of a lathe, shown in Fig. 1, having the face plate 2 and the tail stock 3. 4 is the tool chuck in the tail stock; 5, the button, which is shown secured to the face plate 2. The indicating device is designated, as a whole, by the numeral 6, having the attaching rod 7. 8 is the block member, having the two openings 9 and 10. 11 indicates set screws for securing the rod 7, in either one of the openings 9, or 10. By inserting the rod 7 in the opening 10 instead of the opening 9, as indicated in the drawing, work of relatively larger diameter may be tested, as the distance from the member 19 to the axis of the rod 7 will be increased. Located in an opening in the block 8, is a threaded rod 12, which is integral with the enlarged part 13 of this rod. The instrument 14 is provided with the pointer 15 and the graduated scale 16, as shown. 17 is a nut on the threaded part 18 of the instrument 14, whereby it may be accurately positioned. The pointer 15 is actuated by the pivoted feeler member 19. This construction of the instrument is well known. 20 indicates a set screw for securing the threaded rod 12 in place. 21 is a milled nut for moving the instrument in opposite directions in the block 8.

The operation of my device may be described, as follows:

Assuming the supporting rod 7 is clamped, or secured, in the tool chuck 22 of a drill press, as shown in Figs. 2 and 4, and the button 5 is secured to the plate 23, next, the table 23 is moved, until the feeler 19 engages the button 5, as indicated by the arrow 24. The operator now revolves the chuck 22, carrying the rod 7 around, so that the feeler 19 assumes the dotted line position, shown in Fig. 4 and not in engagement with the opposite side of the button 5, as indicated at 19'. The operator now turns the nut 21 to move the feeler 19, so as to assume a position at ½ of the space between the feeler and the button. The operator continues these operations of moving the table 23, rotating the chuck 22, and turning the nut 21, until the pointer 15 indicates a zero position, in all of its positions, around the outer surface of the button 5. When this is obtained, the axis of the drill chuck then exactly coincides with the axis of the button 5. Now, when a drill, or other tool, as a cutter, is substituted for the rod 7 of the indicator instrument, it will produce accurate work on the piece of work being milled, or drilled, which is understood as being secured to the table 23. The milled nut 21 serves to make the contact of the feeler 19 with the button 5, or ring 25.

In Fig. 5, is shown a ring member 25, formed with an opening 26, on the inner surface of which is shown the feeler 19.

After the final adjustments are made, by moving the table 23 and milled nut 21 so that the pointer 15 stands at zero, as the feeler is carried completely around the button 5, or ring 25, the axis of the drill shaft 22, or other tool-receiving member is then in line with the axis of the button.

In Fig. 6, is shown an indicating instrument 27, in which the dial 28 is larger, to provide greater readings, as shown; otherwise, the use of the instrument is the same. The same operations are carried out in Fig. 1, by alternately adjusting the jaws 2′ and nut 21.

It will be seen, from this description, that I have provided an accurate device for correctly positioning the work in a machine, with reference to the axis of the drive shaft, which carries the cutting tool.

What I claim is:—

In combination with an indicating instrument having a pointer and a feeler member for actuating the pointer, a block to which said instrument is removably secured, a shaft portion on said block having formed thereon threads and a key slot, a second block in which said shaft is slidably secured, key means in said second block engaging said key slot for holding said shaft against turning, said second block being formed with a slot, means revolvably engaged in said slot and threadably engaged on said threaded shaft portion for moving said shaft portion axially, said second block being also formed with a plurality of openings axially at right angles to said shaft portion, and a rod member adapted to be removably secured in one of said last named openings, substantially as described.

HARRY L. KING.